United States Patent [19]

Saito

[11] Patent Number: 4,504,866
[45] Date of Patent: Mar. 12, 1985

[54] IMAGE SENSING APPARATUS

[75] Inventor: Syuichiro Saito, Kanagawa, Japan

[73] Assignee: Canon Kabushiki Kaisha, Tokyo, Japan

[21] Appl. No.: 562,701

[22] Filed: Dec. 19, 1983

[30] Foreign Application Priority Data

Dec. 22, 1982 [JP] Japan ............................. 57-225627

[51] Int. Cl.³ .............................................. H04N 5/30
[52] U.S. Cl. .................................... 358/213; 358/225; 358/209
[58] Field of Search ............... 358/209, 211, 212, 213, 358/214, 215, 216, 217, 225, 227, 228

[56] References Cited

U.S. PATENT DOCUMENTS 4,161,000  7/1979  Cleveland ........................ 358/225
4,280,141  7/1981  McCann ........................... 358/213
4,399,464  8/1983  Hix et al. ........................ 358/213

FOREIGN PATENT DOCUMENTS 0044271  4/1981  Japan ................................. 358/213

Primary Examiner—Gene Z. Rubinson
Assistant Examiner—Robert Lev
Attorney, Agent, or Firm—Toren, McGeady and Stanger

[57] ABSTRACT

An image sensing apparatus includes a solid-state image sensor which converts the image of an object to be photographed into an electrical signal; a shutter which controls a length of time which the image sensor is allowed to irradiate with an image bearing light flux; a storage time control circuit which controls the electric charge storing time of the image sensor; and a setting circuit for setting an exposure time. The setting circuit controls the exposure time by selectively using either the storage control circuit or the shutter in accordance with the output thereof.

15 Claims, 4 Drawing Figures

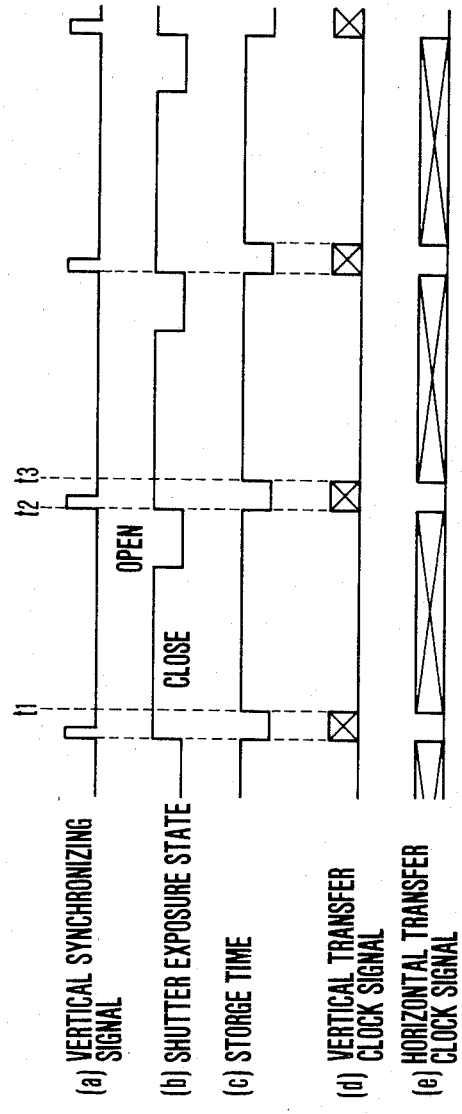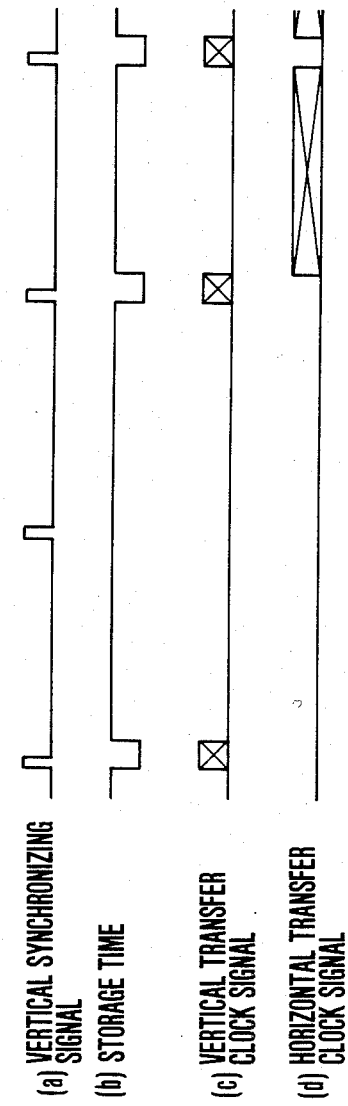

IMAGE SENSING APPARATUS

BACKGROUND OF THE INVENTION

1. Field of the Invention:

This invention relates to an image sensing apparatus which uses a solid-state image sensor in taking either a motion picture or a still picture.

2. Description of the Prior Art

The rapid technological advancement of recent years for semiconductors and magnetic recording has prompted development of electronic cameras of the type which convert the images of objects to be photographed into electrical signals by means of solid-state image sensors and record the electrical signals on magnetic recording media instead of on the film used for conventional silver-halide photography. In an electronic camera of this type, the degree of exposure is controlled by adjusting the electric charge storage time of the image sensor, which corresponds to the exposure time of silver-halide photography cameras. However, if the object to be photographed is extremely bright the exposure is excessive despite a shortened electric charge storage time. In such a situation, therefore, smearing occurs during transfer of the electric charge. This degrades the S/N ratio of image pickup signals.

It is an object of the present invention to provide an image sensing apparatus which is capable of giving an image pickup signal of excellent S/N ratio when the brightness of an object to be photographed is high or low.

It is another object of the invention to provide an image sensing apparatus which is capable of giving a wide range of exposure time values varying from a long to a short exposure time.

These and further objects and features of the invention will become apparent from the following detailed description of a preferred embodiment thereof taken in conjunction with the accompanying drawings.

SUMMARY OF THE INVENTION

An image sensing apparatus comprises image sensing means for converting an optical image into an electrical signal, storage time control means for variably controlling a storage time allowed for storing an electrical image signal at the image sensing means, shutter means for limiting an incident time of the optical image on the image sensing means, and setting means for controlling the quantity of the image signal to be stored at the image sensing means. The setting means has the storage time controlled by the storage time control means and the incident time controlled by the shutter means, accomplished in predetermined combination with each other.

BRIEF DESCRIPTION OF THE DRAWINGS

FIGS. 3 and 4 are timing charts showing operation of the various parts of the circuit arrangement shown in FIG. 2.

DETAILED DESCRIPTION OF THE PREFERRED EMBODIMENT

Figure 1:
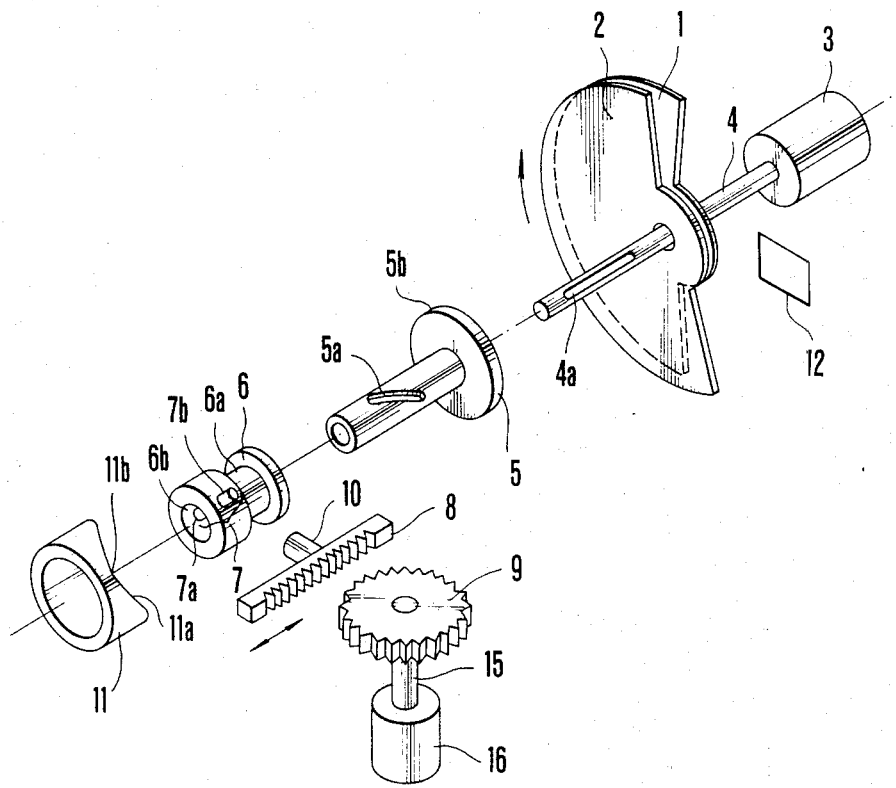
FIG. 1 is a detailed view showing essential parts of an image sensing apparatus in an embodiment of the present invention.

FIG. 1 is a detailed view showing an embodiment of the invention which includes shutter blades 1 and 2 which form a shutter; a shutter blade driving motor 3; a rotation shaft 4 which has the shutter blade 1 secured thereto and is provided with a groove 4a; a bearing 5 which has the shutter blade 2 secured to the end face thereof and is provided with a slot 5a for controlling a shutter opening angle; a cylindrical opening angle control member 6 provided with a fitting hole 6b which slidably engages the bearing 5 and is also provided with an outer circumferential groove 6a for controlling the shutter opening angle; and a pin 7 consisting of an inward extending part 7a which protrudes of inside of the fitting hold 6b and an outward extending part 7b which protrudes outside of the opening angle control member 6. The inward extending part 7a fittingly engages the groove 4a via the slot 5a. A control pin 10 is attached to a rack 8 and fittingly engages the outer circumferential groove 6a. The teeth of the rack 8 engage a gear 9 and are moved in the arrow directions is by the rotation of the gear 9. A motor 16 is rotates the gear 9 and is provided with a driving shaft 15. A cam 11 is secured to a base plate (not shown) disposed within the apparatus. The cam 11 is provided with a cam face 11a and defines the position of the shutter blades 112 by contacting the pin 7. Reference numeral 12 identifies a solid-state image sensor which serves as image pickup means and which converts an object image received via a phototaking lens into an electrical signal. The operation of this embodiment is as described below:

When power is supplied to the motor 3, the rotation shaft 4 and the shutter blade 1, which is secured to the rotation shaft 4, turn together. The driving force of the rotation shaft 4 is transmitted via the pin 7 to the bearing 5 to turn the other shutter blade 2. Then, when the motor 16 moves the control pin 10 either to the right or to the left as viewed on the drawing, the pin 7 moves linearly, parallel with the axis of the rotation shaft 4. Since the bearing 5 has its slot 5a in different angular positions in the circumferential direction thereof based on changes in its axial position, the bearing 5 turns and shifts its position relative to the rotation shaft 4. Accordingly, the relative phases of the shutter blades 1 and 2 to each other change the opening angle of the shutter. Accordingly, with the motor 3 rotating at a constant speed, the exposure time of the image sensor 12 varies.

Assuming that the motor 3 rotates the rotation shaft 4 at 3,600 rpm and that the opening angle between the shutter blades 1 and 2 is 180°, an exposure time of 1/120 sec. is obtained when the rotation phases of the shutter blades 1 and 2 are in perfect alignment. The exposure time becomes shorter than 1/120 sec. if the shutter blades 1 and 2 are opposed to each other.

However, in situations where a longer exposure time than 1/120 sec. is desired, the rotating speed of the rotating shaft 4 must be slower. For such control, however, an additional complex electric circuit arrangement becomes necessary. In this embodiment, the motor 3 stops rotating to stop the shutter blades 1 and 2 when an exposure time longer than 1/120 sec. is required. Then, the motor 16 is operated moving the rack 8, to which is attached the control pin 10, to the left as viewed on the drawing. This brings the outward extending part 7b of the control pin 7 into contact with the cam face 11a. Further movement of the rack 8 then stops the pin 7 at a point where it contacts a dead point 11b of the cam face 11a. At that instant, the shutter has the widest opening angle thereof and the image sensor 12 is no longer shielded from light by the shutter blades 1 and 2.

Figure 2:
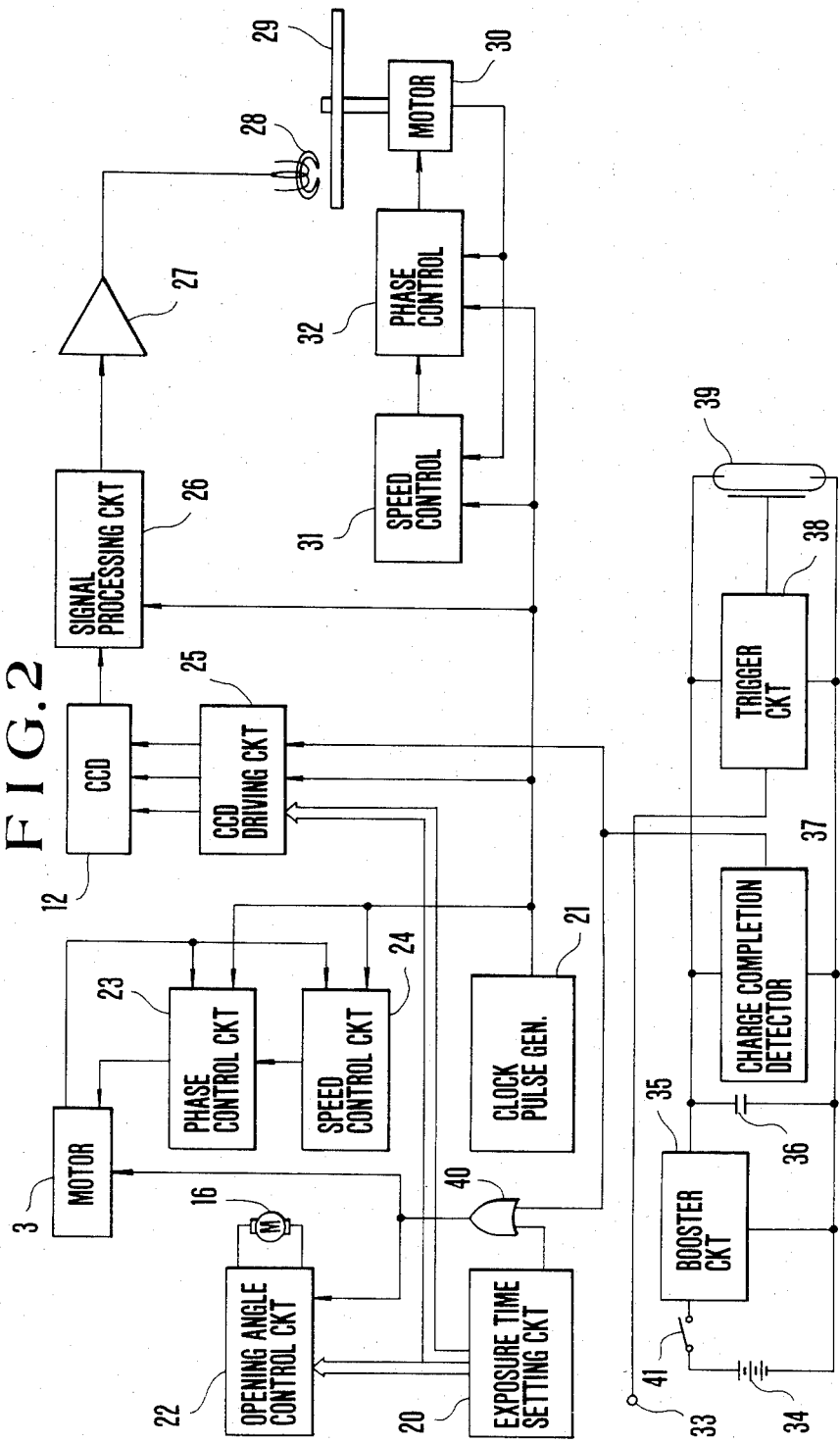
FIG. 2 is a circuit diagram showing a control circuit arrangement in the same embodiment.

The control circuit arrangement of the embodiment shown in FIG. 1 is shown in FIG. 2. The circuit arrangement includes an exposure time setting circuit 20 which serves as setting means; a clock pulse generator 21; an opening angle control circuit 22 which controls the motor 16 as an opening angle controlling means; a motor phase control circuit 23 for controlling the phase of the motor 3; a speed control circuit 24; a CCD (image sensor) driving circuit 25 which serves as storage time control means for controlling the storing time at the CCD (image sensor) 12; a signal processing circuit 26; an amplifier 27; a recording head 28; a disc-shaped recording medium 29; a motor 30 for rotating the recording medium 29; a speed control circuit 31 for controlling the speed of the motor 30; a phase control circuit 32; a flash trigger signal input terminal 33; a battery 34 for a flash device; a booster circuit 35; a capacitor 36; a charge completion detecting circuit 37 which detects completion of a charging process; a trigger circuit 38; a flash discharge tube 39; and an OR gate 40.

The operation of the circuit arrangement of FIG. 2 will be described with reference to the time charts of FIGS. 3 and 4 as follows: FIG. 3 shows the operation when the exposure time is shorter than 1/120 sec. and FIG. 4 shows the operation when the exposure time is longer than 1/120 sec. The exposure time setting circuit 20 may either automatically set an exposure time on the basis of the output signal of the CCD image sensor 12 or the output of some other light measuring element or convert a manually set exposure time setting value from outside into an electrical signal.

When the setting circuit 20 sets the exposure time at a value shorter than 1/120 sec., the opening angle control circuit 22 controls the motor 16 in accordance with the setting value thus obtained, so that the exposure time is controlled based on the setting value. The motor 3 for turning the shutter blades 1 and 2 is rotated in synchronization with the vertical synchronizing signal of 60 Hz of a normal television signal when controlled by the phase control circuit 23 and at 3,600 rpm when controlled by the speed control circuit 24. The recording medium 29 is also rotated in synchronization with the 60 Hz vertical synchronizing signal of the normal television signal at 3,600 rpm with the phase and the constant speed controlled by these control circuits 31 and 32.

The CCD driving circuit 25 divides a frequency of the clock pulses produced from the clock pulse generator 21 and produces and supplies to the CCD image sensor 12 a storage time control signal as shown in FIG. 3(c), a vertical transfer clock signal as shown in FIG. 3(d), and a horizontal transfer clock signal as shown in FIG. 3(e).

When the exposure time is set at a value less than 1/120 sec. by the setting circuit 20, the storage time is fixed at about 1/60 sec. The control operation is performed as follows: The shutter blades 1 and 2 then expose the CCD image sensor 12 to light within the storage time t1–t2. The light incident upon the CCD image sensor 12 is blocked during the vertical transfer time t2–t3. Accordingly, exposure to light is inhibited during the vertical transfer time, so that the possibility of smearing can be eliminated. The object image pickup electric charge is read out according to the horizontal transfer clock signal that follows the vertical transfer. The electric charge thus read out is changed by the signal processing circuit 26 into a signal suitable for recording. The signal thus processed is impressed via the amplifier 27 on the recording head 28 and is recorded on the recording medium 29.

In the event that the exposure time is set at a value greater than 1/120 sec. by the setting circuit 20, the control circuit arrangement of the embodiment operates as follows: A signal indicates that the exposure time set by the setting circuit 20 at a value longer than 1/120 sec. is supplied via the OR gate 40 to the opening angle control circuit 22 and also to the motor 3. The motor 3 then stops. The opening angle control circuit 22 rotates the other motor 16 in a predetermined direction. This brings the pin 7 of FIG. 1 to the dead point 11b of the cam 11. As a result, the CCD image sensor 12 continuously exposed. The setting value of the setting circuit 20 is produced at the CCD driving circuit 25. Then, the driving circuit 25 controls the storage time (FIG. 4(b)) based on the setting value. In FIG. 4, the exposure time is set at 1/30 sec. Upon storage completion, the vertical transfer clock signal causes the electric charge of an image sensing part 12 to be transferred to a storing part. Then, a horizontal transfer clock signal then causes the stored electric charge to be transferred to the signal processing circuit 26. The ensuing process is the same as in the preceding example.

With a longer set exposure time, the exposure time is thus controlled by the storage time as mentioned above. This arrangement permits simplification of a shutter control circuit. Furthermore, since the object to be photographed has a low brightness level when the exposure time is long, smearing seldom happens during vertical transfer.

In flash photography, the circuit arrangement operates as follows: When a switch 41 turns on, the capacitor 36 begins to be charged. Upon completion of the charging process, the output signal level of the detecting circuit 37 becomes high. The output signal of the detecting circuit 37 is transmitted via the OR gate 40 to the motor 3, the opening angle control circuit 22 and the driving circuit 25. Then, the motor 3 stops regardless of the setting of the setting circuit 20. Meanwhile, the other motor 16 rotates in the predetermined direction making the shutter blades 1 and 2 completely expose the CCD image sensor 12 to light. The CCD driving circuit 25 likewise sets the storage time at 1/60 sec. regardless of the output of the setting circuit 20. After flashing by the flash discharge tube in response to a trigger signal from the flash trigger signal input terminal 33, the electric charge of the image pickup part of the CCD image sensor 12 is transferred to the storage part thereof and then transferred to the signal processing circuit 26.

Thus, when the flash device is used, the object image is sensed by the image sensor 12 and also with the light flux bearing the object image, which is completely unblocked by the shutter.

This specific embodiment uses a rotary shutter as the shutter means. However, shutters of other types such as a focal plane shutter, a lens shutter, etc. can be used in accordance with the invention. Furthermore, this embodiment uses a CCD as the image sensor 12. However, solid-state image sensors of other types such as the MOS type, the BBD type, etc. can also be used in accordance with the invention. In this specific embodiment, a mechanical cam mechanism is employed to keep the shutter full open. However, this function can be accomplished electrically by attaching a suitable position sensor to the motor 3. Furthermore, the full open condition of the shutter can be detected by some optical arrangement.

In accordance with this invention, as described in the foregoing, a short exposure time is controlled by shutter means and a long exposure time by the storage time. This invention, therefore, permits operation with a wide range of exposure time values. Besides, the invention deletes smearing even for an extremely bright object. Another advantage of the invention is that it permits simplification of the shutter arrangement. It is a further advantage that, by using a rotary shutter as shutter means, exposure time control is possible for both motion and still pictures.

What I claim:

1. An image sensing apparatus comprising:
   (a) image sensing means for converting an optical image into an electrical signal;
   (b) storage time control means for variably controlling a storage time allowed for storing an electrical image signal at said image sensing means;
   (c) shutter means for limiting an incident time of said optical image on said image sensing means; and
   (d) setting means for controlling the quantity of the image signal to be stored at said image sensing means, said setting means having the storage time control by said storage time control means and the incident time control by said shutter means accomplished in predetermined combination with each other.

2. An apparatus according to claim 1, wherein said storage time control means controls a read-out period for reading out an electrical image signal at said image sensing means.

3. An apparatus according to claim 1, wherein said image sensing means is a CCD solid-state image sensor; and said storage time control means is arranged to control the transfer period of said CCD solid-state image sensor.

4. An apparatus according to claim 1, wherein said shutter means includes a rotary shutter.

5. An apparatus according to claim 1, wherein said setting means sets a predetermined value of time and varies the combination of the storage time control state by said storage time control means and the incident time control state by said shutter means in accordance with said predetermined value of time.

6. An apparatus according to claim 5, wherein said setting means fixes the storage time and varies the light incident time defined by said shutter means when a setting value of time is shorter than said predetermined value of time.

7. An apparatus according to claim 6, wherein said setting means releases limitation of the incident time by said shutter means and varies the storage time by said storage time control means when said setting value of time is longer than said predetermined value of time.

8. An image sensing apparatus comprising:
   (a) image sensing means for converting an optical image into an electrical signal;
   (b) storage time control means for variably controlling a storage time allowed for storing an electrical image signal at said image sensing means;
   (c) shutter means for limiting an incident time of said optical image on said image sensing means; and
   (d) setting means arranged to form a signal for selectively causing either said storage time control means to perform time varying control thereof or said shutter means to perform time varying control thereof.

9. An apparatus according to claim 8, wherein said storage time control means controls a read-out period for reading out an electrical image signal at said image sensing means.

10. An apparatus according to claim 9, wherein said image sensing means is a CCD solid-state image sensor; and said storage time control means is arranged to control the transfer period of said CCD solid-state image sensor.

11. An apparatus according to claim 8, wherein said shutter means includes a rotary shutter.

12. An apparatus according to claim 8, wherein said setting means sets a predetermined value of time and the combination of the storage time control state by said storage time control means and the incident time control state by said shutter means in accordance with said predetermined value of time.

13. An apparatus according to claim 13, wherein said setting means fixes the storage time and varies the light incident time defined by said shutter means when a setting value of time is shorter than said predetermined value of time.

14. An apparatus according to claim 13, wherein said setting means releases limitation of the incident time by said shutter means and varies the storage time by said storage time control means when said setting value of time is longer than said predetermined value of time.

15. An image sensing apparatus comprising:
   (a) image sensing means for converting an optical image into an electrical signal;
   (b) a rotary shutter arranged to limit the incident time of an optical image on said image sensing means;
   (c) opening angle control means for controlling the opening angle of said rotary shutter; and
   (d) setting means having two operating modes, said setting means, in one mode, varying said opening angle by said opening angle control means in accordance with a setting value and, in the other mode, causing said opening angle control means to bring said rotary shutter to a stop in a state of not limiting incident light on said image sensing means at a predetermined setting value.

* * * * *